United States Patent [19]

Funatsu et al.

[11] Patent Number: 5,846,470
[45] Date of Patent: Dec. 8, 1998

[54] PROCESS FOR PRODUCTION OF PHENOLIC RESIN PULLEY

[75] Inventors: Atsushi Funatsu; Yoshifumi Kimura; Hidemi Yazawa, all of Fujieda, Japan

[73] Assignee: Sumitomo Bakelite Company Limited, Tokyo, Japan

[21] Appl. No.: 453,275

[22] Filed: May 30, 1995

[30] Foreign Application Priority Data

Jun. 8, 1994 [JP] Japan ..................................... 6-125988
Jun. 16, 1994 [JP] Japan ..................................... 6-134703

[51] Int. Cl.$^6$ ........................... B29C 45/14; B29C 70/60; B29C 70/70
[52] U.S. Cl. ................... 264/275; 264/271.1; 264/328.7; 264/328.18
[58] Field of Search ...................... 264/255, 259, 264/271.1, 275, 277, 278, 266, 328.7, 328.18

[56] References Cited

U.S. PATENT DOCUMENTS

| | | | |
|---|---|---|---|
| 4,094,952 | 6/1978 | Frank | 264/108 |
| 5,053,106 | 10/1991 | Miller et al. | 264/344 |
| 5,372,767 | 12/1994 | Zimmermann et al. | 264/255 |
| 5,507,698 | 4/1996 | Kuribashi | 474/170 |

FOREIGN PATENT DOCUMENTS

| | | |
|---|---|---|
| 0107431 | 2/1984 | European Pat. Off. . |
| 6487968 | 4/1989 | Japan . |
| 4249568 | 10/1992 | Japan . |

*Primary Examiner*—Angela Ortiz
*Attorney, Agent, or Firm*—Browdy and Neimark

[57] ABSTRACT

The present invention provides a process for producing a phenolic resin-made pulley having a metal insert embedded therein, which process comprises:

setting a metal insert in the form of a cylinder or a circular solid shaft in a cavity of a mold having a movable side die, a fixed side die and the cavity, closing the mold in a state in which a part or the whole of the movable side die has been moved backward by a given distance from its predetermined position to be taken when a pulley to be produced has a final shape, injecting a phenolic resin molding material into the cavity to fill the cavity with the molding material, preferably sealing a gate of the mold with a gate-sealing pin, and substantially simultaneously with or after the gate sealing moving forward the part or the whole of the movable side die moved backward, to said predetermined position to mold a phenolic resin-made pulley.

This process is particularly effective to mold a phenolic resin-made pulley having holes formed in its disc portion. Said pulley can be produced according to the above process, for example, by closing the mold in a state in which pins used for forming said holes have been moved backward from their predetermined positions to be taken later, injecting a phenolic resin molding material into the cavity to fill the cavity with the molding material, preferably sealing a gate of the mold with a gate-sealing pin, and substantially simultaneously with or after the gate sealing moving forward the pins to said predetermined positions to mold said pulley.

The present invention also provides a phenolic resin composition suitably used in the above process for pulley production.

4 Claims, 3 Drawing Sheets

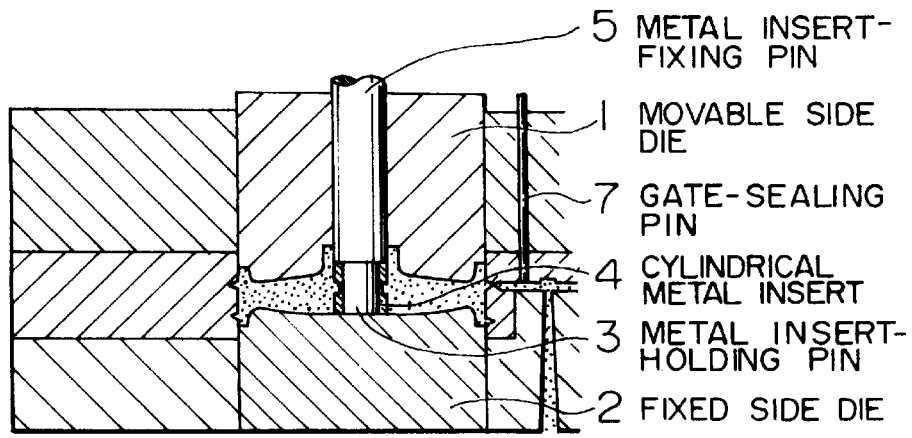
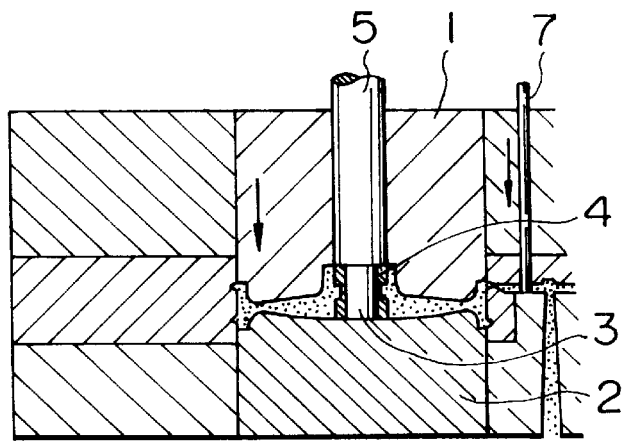
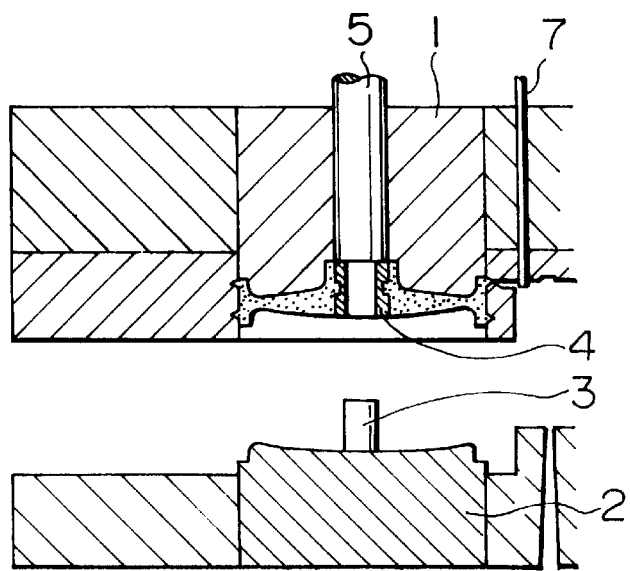

5 METAL INSERT-FIXING PIN
6 PIN FOR FORMING A HOLE
1 MOVABLE SIDE DIE
7 GATE-SEALING PIN
4 CYLINDRICAL METAL INSERT
3 METAL INSERT-HOLDING PIN
2 FIXED SIDE DIE

- 22 WELDED PORTION
- 21 METAL INSERT
- 20 PINPOINT GATE

- 22
- 23 HOLE
- 21
- 20

PROCESS FOR PRODUCTION OF PHENOLIC RESIN PULLEY

FIELD OF THE INVENTION

The present invention relates to a process for producing a phenolic resin-made pulley having a metal insert embedded therein, as well as to a phenolic resin composition used in said process.

REVIEW OF THE RELATED TECHNOLOGY

In automobiles, use of smaller and more lightweight parts is in progress in order to achieve improved fuel consumption, etc. Lighter weight and higher performance are required as well in mechanical parts such as piston, gear, pulley and the like; and switch from metal-made parts (e.g. parts made of die castings, sheet metals and sintered materials) to resin-made parts is under study.

As to the pulleys for automobiles, which are required to have belt abrasion resistance, dimensional precision and heat resistance, there have been studied, for example, polyamide resin-made or phenolic resin-made pulleys containing a glass fiber as the filler, and a phenolic resin-made pulley containing a cotton cloth as the filler (e.g. JP-A-64-87968).

These resin-made pulleys, however, have problems as follows. The polyamide resin-made pulley containing a glass fiber as the filler tends to cause melting and falling-off by the abnormal heat generated when slippage occurs between the pulley and a belt, and is therefore insufficient in reliability. The phenolic resin-made pulley containing a glass fiber as the filler has a detrimental drawback in that the pulley brings about belt abrasion easily.

The phenolic resin-made pulley containing a cotton cloth as the filler is superior in belt abrasion resistance, but has no sufficient strength when a solid or powdery resin is used and dry kneading is conducted because no sufficient impregnation of the filler with the resin is expected.

Under such a situation, it has been necessary to develop a phenolic resin-made pulley having excellent heat resistance, strength and abrasion resistance.

Resin-made pulleys are generally produced by compression molding or injection molding. In compression molding, the molded pulley has, in practical use, no problems in strength, etc.; however, the molding time is long and production of a plurality of pulleys is impossible, resulting in low productivity.

Meanwhile, in injection molding, productivity is high; however, pulley molding is generally conducted by utilizing pinpoint gates extending to the disc portion of a pulley to be molded. FIG. 3A shows a resin-made pulley molded by a pinpoint gate process. Such a pulley has a very small strength at the welded portions (22) about the metal insert (21) and accordingly does not fully satisfy the properties required when used as an important mechanical part of an automobile, etc. In the case of a pulley having holes (23) in the disc portion, as shown in FIG. 3B, the pinpoint gates (20) are inevitably provided near the metal insert-resin interfaces, allowing the pulley to have a further smaller strength.

In injection molding, use of a side gate process is considered. In this process, however, the welded portion is formed at the pulley portion opposite to the gate, and the strength at the welded portion is even smaller than that obtained in the pinpoint gate process. In the case of a pulley having holes, in particular, the pins used for forming the holes are provided as a part of the cavity so as to extend in the entire length of the cavity; therefore, in feeding a molding material into the cavity, the pins interrupt the smooth feeding of the molding material, a jumping phenomenon takes place at the pulley portion opposite to the gate, and the strength at the welded portion gets further smaller. In any rate, in injection-molding a phenolic resin-made pulley, the strength at the welded portion is inevitably small and such a pulley finds yet no practical application as a mechanical part of an automobile, etc.

SUMMARY OF THE INVENTION

As described above, the phenolic resin-made pulleys produced by injection-molding a conventional phenolic resin molding material are inferior in strength, etc. and do not satisfy the requirements therefor. The present invention is intended to provide a phenolic resin-made pulley free from the above-mentioned problems and having excellent productivity.

The present invention provides a process for producing a phenolic resin-made pulley having a metal insert embedded therein, which process comprises:

setting a metal insert in the form of a cylinder or a circular solid shaft in a cavity of a mold having a movable side die, a fixed side die and the cavity, closing the mold in a state in which a part or the whole of the movable side die has been moved backward by a given distance from its predetermined position to be taken when a pulley to be produced has a final shape, injecting a phenolic resin molding material into the cavity to fill the cavity with the molding material, preferably sealing a gate of the mold with a gate-sealing pin, and substantially simultaneously with or after the gate sealing moving forward the part or the whole of the movable side die moved backward, to said predetermined position to mold a phenolic resin-made pulley.

This process is particularly effective to mold a phenolic resin-made pulley having holes formed in its disc portion. Said pulley can be produced according to the above process, for example, by closing the mold in a state in which pins used for forming said holes have been moved backward from their predetermined positions to be taken later, injecting a phenolic resin molding material into the cavity to fill the cavity with the molding material, preferably sealing a gate of the mold with a gate-sealing pin, and substantially simultaneously with or after the gate sealing moving forward the pins to said predetermined positions to mold said pulley.

BRIEF DESCRIPTION OF THE DRAWING

FIGS. 1A to 1C and FIGS. 2A to 2D are sectional views showing examples of the mold used in the present process for producing a phenolic resin-made pulley by injection molding.

DETAILED DESCRIPTION OF THE PREFERRED EMBODIMENT

Figure 2A:
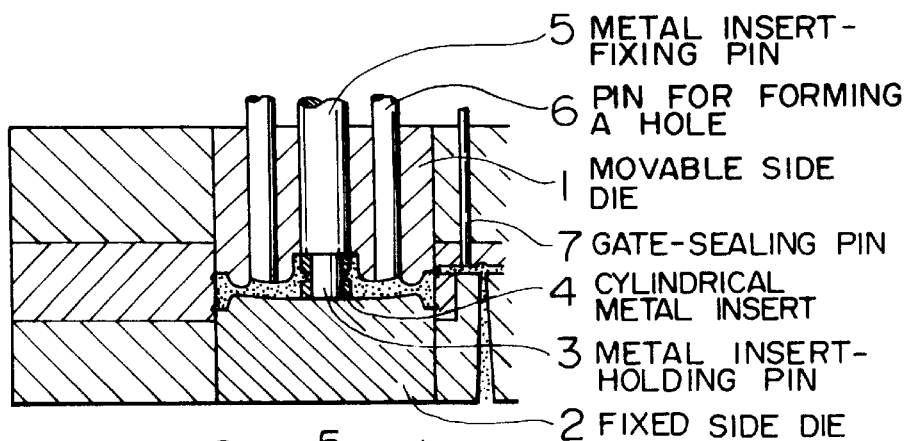

In FIG. 1A, the metal insert (4) is held by the pin (3) of the fixed side die (2) and fixed by the pin (5). FIG. 1A shows a state in which the movable side die (1) has been moved backward from the predetermined position and a molding material has been filled in the cavity. FIG. 1B shows a state in which the gate-sealing pin (7) has been moved forward to seal the gate of the mold and then the movable side die (1) has been moved forward to said predetermined position. Thereafter, the mold is opened to take out a molded resin-made pulley. FIG. 1C shows a state in which the mold has been opened. In the above sequential operations, gate sealing may be omitted. When no gate sealing is conducted, however, the molding material flows back into a cylinder of the injection molding machine when the movable side die is moved forward, and no sufficient pressurization is made (i.e. no sufficient pressure increase in the cavity is obtained); as a result, the pulley obtained tends to have an insufficient strength. Hence, it is preferable to conduct gate sealing.

Figure 2B:
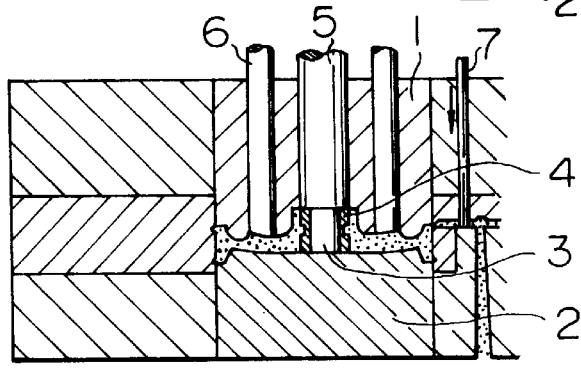
Figure 2C:
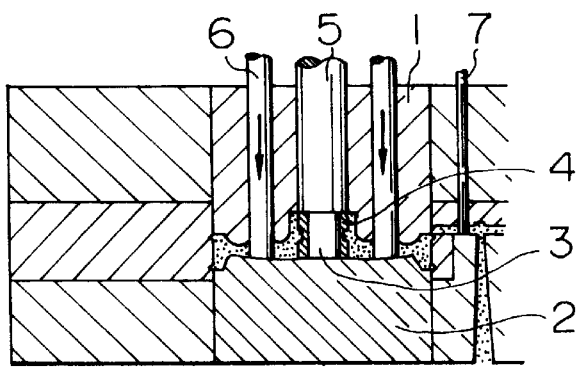
Figure 2D:
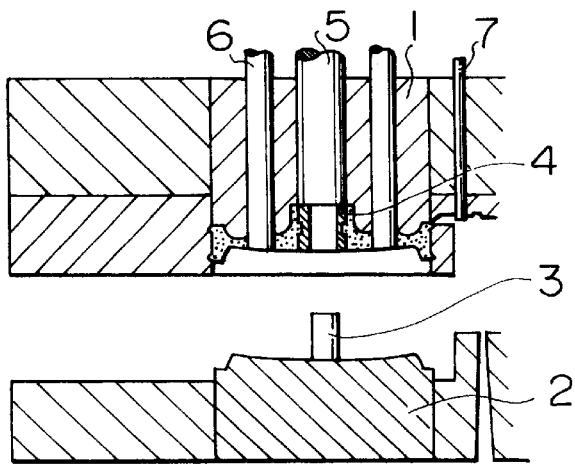

FIG. 2A shows a state in which the mold has been closed, the pins (6) used for forming holes and the gate-sealing pin (7) have been moved backward, and the molding material has been filled in the cavity. FIG. 2B shows a state in which the gate-sealing pin (7) has been moved forward and the gate has been sealed. FIG. 2C shows a state in which the pins (6) used for forming holes have been moved forward to the predetermined positions. FIG. 2D shows a state in which the mold has been opened in order to take out a molded pulley.

Typical examples of the processes for molding resin-made pulleys using the above molds are described below.

Figure 3A:
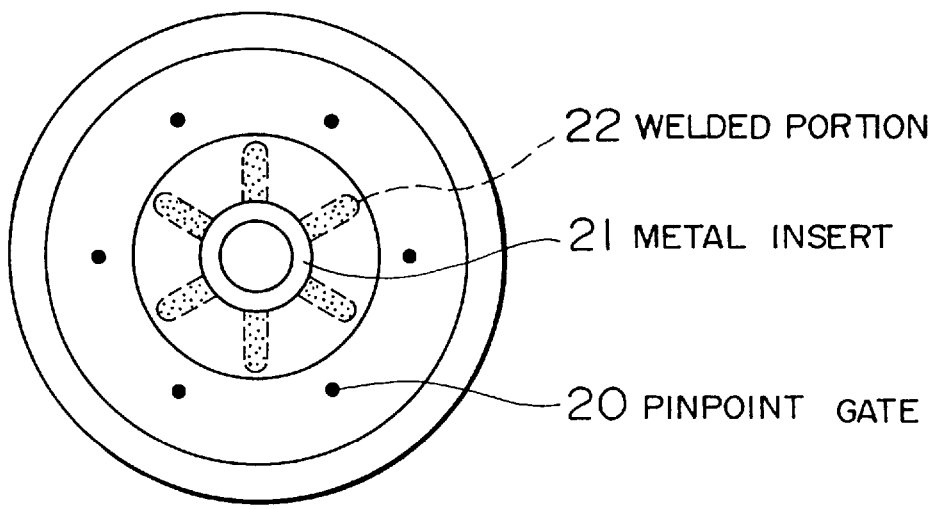
FIGS. 3A to 3B are plane views each showing a resin-made pulley produced by a conventional injection molding process, wherein the positions of the gates and the welded portions are indicated. In these figures, (1) is a movable side die; (2) is a fixed side die; (3) is a metal insert-holding pin; (4) is a cylindrical metal insert; (5) is a metal insert-fixing pin; (6) are pins for forming holes; and (7) is a gate-sealing pin.

When the mold shown in FIGS. 1A to 1C is used, the mold is closed in a state in which the movable side die has been moved backward by a given distance from the predetermined position, and a molding material is filled in the cavity [FIG. 1A]. Then, the gate is quickly sealed by the use of a gate-sealing pin and further the movable side die is moved forward to the predetermined position, whereby the packing density of the molding material in the cavity is increased and the strength of the pulley portion corresponding to the welded portions (22) of the conventional pulley shown in FIG. 3A is increased [FIG. 1B]. Thereafter, when the molding material in the cavity has been cured or solidified sufficiently, the mold is opened [FIG. 1C] and a molded resin-made pulley is taken out.

Figure 3B:
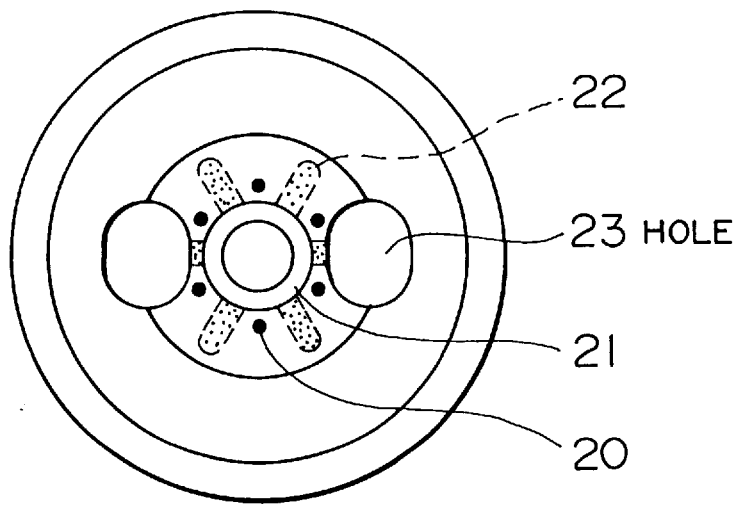

When the mold shown in FIGS. 2A to 2D is used, the mold is closed in a state in which the pins (6) used for forming holes have been moved backward, and a molding material is filled in the cavity [FIG. 2A]. Then, the gate is quickly sealed by the use of a gate-sealing pin [FIG. 2B]. Subsequently, the pins (6) are moved forward to the predetermined positions to form holes in the molding material in the cavity, whereby the packing density of the molding material in the cavity is increased and the strength of the pulley portion corresponding to the welded portions (22) of the conventional pulley shown in FIG. 3B is increased [FIG. 2C]. Thereafter, when the molded material in the cavity has been cured or solidified sufficiently, the mold is opened [FIG. 2D] and a molded resin-made pulley is taken out.

In the above description, the pins (6) used for forming holes are provided in the movable side die (1), but they may be provided in the fixed side die (2). The pins (6) are moved forward or backward by an external force. Gate sealing by the use of a gate-sealing pin is conducted before the pins (6) are moved forward to the predetermined positions, but gate sealing and forward movement of the pins may be conducted substantially simultaneously.

The above explanations have been given on the case where a metal insert is in the form of a cylinder. In the case where a metal insert is in the form of a circular solid shaft, a metal insert-holding pin is not provided but a dent is provided at the position of the metal insert-holding pin on a fixed side die. A metal insert in the form of a circular solid shaft is set in the dent and fixed with a metal insert-fixing pin, and then the similar treating procedures as stated above can be carried out to produce a phenolic resin-made pulley.

As mentioned previously, in the conventional resin-made pulleys by the conventional injection molding method, the welded portions have a very low strength. In contrast, in the present invention, the molding material is smoothly filled in the cavity by beforehand moving the pins (used for forming holes) backward from the predetermined positions so as substantially not to be in the cavity, as shown in FIG. 2A; then, the pins are moved forward into the cavity by the use of an external force to form holes; thereby, the packing density of the molding material filled in the cavity is increased and the welded portion can have a sufficient strength.

In the present process for pulley molding, there can be employed a side gate process, a multiple pinpoint gate process, etc. A side gate process is more preferable than a multiple pinpoint gate process, because in the former process, the residual stress in the vicinity of the gate is small and resultantly swelling in the vicinity of the gate occurs hardly, the molding cycle can be shortened, and production of a plurality of pulleys is possible. Further in the former process, gate sealing can be conducted by the use of a gate-sealing pin after the filling of the molding material, and therefore the pressure inside the cavity can be kept constant at the peak level and the welded portion can have a much higher strength.

Typical materials used for molding of a resin-made pulley include a phenolic resin molding material. In the present process for production of a resin-made pulley, there is used a phenolic resin molding material, particularly a phenolic resin molding material containing, as the main filler, pulverized cloth obtained by pulverizing a cotton cloth such as knitting, crepe, denim or the like.

In the present invention, the matrix resin used in the phenolic resin molding material is a phenolic resin. Thermoplastic resins (which are engineering plastics) such as polyamide and the like have no sufficient heat resistance and are not suitable for use in mechanical parts exposed to high temperatures. When they are used in a pulley, in particular, they cause melting and falling-off when there arise slippage between the pulley and a belt and subsequent generation of abnormal heat. In contrast, the phenolic resin (a thermosetting resin) is free from the above problem and is most suitable as a matrix resin for use in automobile mechanical parts such as a pulley and the like. The phenolic resin used in the present invention may be any of a novolac type phenolic resin, a resole type phenolic resin and a modified phenolic resin.

In the present invention, the main filler used in the phenolic resin molding material is a pulverized cotton cloth, or a pulverized cotton cloth plus a powdery organic fiber such as wood flour, pulp or the like. When the phenolic resin molding material is made into a pulley, the material containing, as the filler, fine pieces of cloth (e.g. cotton cloth) is sufficient in view of the belt abrasion resistance alone; however, the pulley made of such a phenolic resin molding material tends to have (1) partial low strength because of poor impregnation with the material and (2) poor finish when flashes generate.

In contrast, the pulley made of a phenolic resin molding material containing pulverized cotton cloth as the filler has not only excellent belt abrasion resistance but also very high impact resistance. Herein, "impact resistance" of a pulley refers to impact resistance when the pulley is, for example, dropped on a floor during its handling. This impact resistance is tested according to a falling ball test; that is, a pulley is placed on a slope of 45°, a steel ball of 50 mm in diameter is dropped from a given height so as to hit the top end of the pulley, and the formation of defects such as cracks and the like is examined. The pulverized cotton cloth used in the present invention is pulverized crepe, pulverized knitting, pulverized denim or the like and may be a combination of two or more kinds of these.

The size of pulverized cotton cloth is preferably such that it passes through screens in the range of 5–140 mesh. When pulverized cotton cloth passing through screens more coarse than 5 mesh is used, the resulting phenolic resin molding material gives a pulley of high dropping impact resistance and high falling ball impact resistance, but the pulley has no smooth surface in many cases and tends to have low gloss and a rough surface. When pulverized cotton cloth passing through screens finer than 140 mesh is used, the resulting phenolic resin molding material gives a pulley of insufficient dropping impact resistance and insufficient falling ball impact resistance. The size of pulverized cotton cloth is more preferably such that it passes through screens in the range of 10–60 mesh.

The powdery organic fiber such as wood flour, pulp or the like can be used in a size finer than the 80–100 mesh ordinarily used in phenolic resin molding materials. Use of a glass fiber should be avoided in view of the abrasiveness. A powdery inorganic filler ordinarily used in phenolic resin molding materials may be used unless it adversely affects the antiabrasion property of the resulting phenolic resin molding material. Typical examples of the powdery inorganic filler are clay, calcium carbonate, mica and aluminum hydroxide, and each of them can be used in combination with the main filler. Silica, which is a very hard substance, had better not be used.

The amount of the total filler used is preferably 50–200 parts by weight per 100 parts by weight of the phenolic resin used. When the amount is less than 50 parts by weight, the resulting phenolic resin molding material fails to provide a sufficient strength. When the amount is more than 200 parts by weight, the resulting phenolic resin molding material has inferior moldability, making the practical application impossible in some cases. The amount X (wt. %) of the pulverized cotton cloth and the amount Y (wt. %) of the powdery organic filler (e.g. wood flour or pulp) in the total filler are preferably as follows.

$$15 \leq X \leq 100$$

$$60 \leq X+Y \leq 100$$

When X<15, no sufficient strength can be obtained. When (X+Y)<60, there arises low moldability, particularly inferior chargeability in injection molding. The more preferable amount of the pulverized cotton cloth is $15 \leq X \leq 50$. When $15 \leq X \leq 50$, the phenolic resin molding material can be prepared by an ordinary method, i.e. kneading under heating and grinding. When X>50, pulverized cotton cloth takes a large bulk and becomes an obstacle in injection molding; therefore, it is suitable to employ granulation wherein high-speed stirring under heating is conducted in the presence of an appropriate amount of a solvent.

According to the present process, there is provided a phenolic resin-made pulley which is almost completely free from reduction in strength caused by welding and which maintains the excellent heat resistance, abrasion resistance and strength possessed by the components used. Further in the present invention, when a side gate process is employed, shortening of molding cycle and production of a plurality of pulleys are made possible, contributing to high productivity and decreased sprue and runner (the sprue and runner are waste materials). Thus, in the present process, there can be provided a resin-made pulley of lower cost, having a very high industrial value as a part for an automobile.

The present invention is hereinafter described with reference to Examples and Comparative Examples. In the followings, "parts" refer to "parts by weight". The component formulations and molding methods employed are summarized in Table 1. Components were kneaded by the use of a hot mill or heat-kneaded by the use of a Henschel mixer to obtain phenolic resin molding materials.

EXAMPLE 1

A phenolic resin molding material was prepared according to the formulation and kneading means shown in Table 1. The molding material was subjected to injection molding by the use of a mold [cavity size=100 mm (diameter) and 70 $cm^3$ (volume)] shown in FIGS. 1A to 1C, under the conditions of mold temperature=160° C., cylinder temperature= 90° C. (front) and 50° C. (back), curing time=50 seconds and molding cycle=70 seconds, to obtain a pulley product having a cylindrical metal insert in the center. In this operation, the movable side die was beforehand moved backward by 2 mm from the predetermined position and, after 3 seconds from the completion of molding material injection, was moved forward to the predetermined position to obtain a pulley product of the desired shape.

EXAMPLE 2

A phenolic resin molding material was prepared according to the formulation and kneading means shown in Table 1. The molding material was subjected to injection molding by the use of a mold shown in FIGS. 1A to 1C, under the conditions of mold temperature=170° C., cylinder temperature=90° C. (front) and 50° C. (back), curing time= 40 seconds and molding cycle=60 seconds, to obtain a pulley product having a cylindrical metal insert in the center. In this operation, the movable side die was beforehand moved backward by 2 mm from the predetermined position and, after 3 seconds from the completion of molding material injection, was moved forward to the predetermined position to obtain a pulley product of the desired shape.

EXAMPLE 3

A phenolic resin molding material was prepared according to the formulation and kneading means shown in Table 1. The molding material was subjected to injection molding by the use of a mold shown in FIGS. 2A to 2D [having the same cavity dimension as the mold of FIGS. 1A to 1C], under the conditions of mold temperature=170° C., cylinder temperature=80° C. (front) and 40° C. (back), curing time= 50 seconds and molding cycle=70 seconds, to obtain a pulley product having a cylindrical metal insert in the center. In this operation, the pins used for forming holes were beforehand moved backward to the top ends of the holes to be formed and, after 5 seconds from the completion of molding material injection, were moved forward to the predetermined positions to obtain a pulley product of the desired shape having holes.

EXAMPLE 4

The same phenolic resin molding material as used in Example 3 was subjected to injection molding by the use of a mold shown in FIGS. 2A to 2D under the conditions of mold temperature=170° C., cylinder temperature=80° C. (front) and 40° C. (back), curing time=45 seconds and molding cycle=65 seconds, to obtain a pulley product having a cylindrical metal insert in the center. In this operation, the pins used for forming holes were moved backward to the top ends of the holes to be formed; after 2 seconds from the completion of molding material injection, the gate-sealing pin was moved forward to seal the gate; after 1 second from the sealing, the pins were moved forward to the predetermined positions to obtain a pulley product of the desired shape having holes.

Comparative Example 1

The same phenolic resin molding material as used in Example 1 was subjected to compression molding by the use of a mold for compression molding having the same cavity shape as the mold of FIGS. 1A to 1C, under the conditions of tablet preheating temperature=95° C., mold temperature=160° C., curing time=3 minutes and molding cycle=5 minutes to obtain a pulley product having a cylindrical metal insert in the center.

Comparative Example 2

The same phenolic resin molding material as used in Example 2 was subjected to injection molding by the use of a mold fixed in the same state as shown in FIG. 1B except that no gate sealing was made, under the conditions of mold temperature of 170° C., cylinder temperature=90° C. (front) and 50° C. (back), curing time=40 seconds and molding cycle=60 seconds to obtain a pulley product having a cylindrical metal insert in the center.

Comparative Example 3

The same phenolic resin molding material as used in Examples 3 and 4 was subjected to injection molding by the use of a mold fixed in the same state as shown in FIG. 2C except that no gate sealing was made, under the conditions of mold temperature of 170° C., cylinder temperature=80° C. (front) and 40° C. (back), curing time=50 seconds and molding cycle=70 seconds to obtain a pulley product having a cylindrical metal insert in the center and holes in the disc portion.

Comparative Example 4

A phenolic resin molding material prepared according to the formulation and kneading means shown in Table 1 was subjected to injection molding by the use of a mold fixed in the same state as shown in FIG. 2C except that no gate sealing was made, under the conditions of mold temperature of 170° C., cylinder temperature=90° C. (front) and 50° C. (back), curing time=40 seconds and molding cycle=60 seconds to obtain a pulley product having a cylindrical metal insert in the center and holes in the disc portion.

On the phenolic resin-made pulleys obtained by the processes of Examples 1–4 and Comparative Examples 1–4, their productivities (molding cycles) and properties are summarized in Table 2. As appreciated from Table 2, in the injection molding of the present invention in which a part or the whole of the movable side die is moved forward after the completion of injection, the resulting phenolic resin-made pulley has not only excellent productivity but also excellent mechanical properties (e.g. excellent heat shock resistance). When the phenolic resin molding material used contains a large amount of an organic filler (e.g. pulverized cotton cloth) as in Examples 3 and 4, the resulting pulley well maintains the properties inherently possessed by the components used in the molding material. The pulleys produced by the conventional ordinary injection molding maintain no such properties, and the pulley produced by compression molding has good properties but inferior productivity.

TABLE 1

Component Formulation, Component-Kneading Means and Molding Method

|  |  | Example 1 | Example 2 |
|---|---|---|---|
| Component Formulation (parts by weight) | Novolac resin | 100 | 100 |
|  | Resole resin |  |  |
|  | Hexamethylenetetramine | 15 | 15 |
|  | Wood flour | 70 | 30 |
|  | Pulp |  | 30 |
|  | Pulverized cotton cloth (fiber length = about 1 mm) |  | 40 |
|  | Calcium carbonate | 30 |  |
|  | Glass fiber (13 μ × 3 mm) |  |  |
|  | Others (curing aid, lubricant, etc.) | 15 | 15 |
|  | Methanol |  |  |
| Component-kneading means |  | Roll | Roll |
| Molding method | Injection molding wherein the movable side die was moved forward after injection of molding material | ○ | ○ |
|  | Ordinary injection molding |  |  |
|  | Compression molding |  |  |
|  | Gate sealing | Not conducted | Not conducted |

|  |  | Example 3 | Example 4 | Comparative Example 1 | Comparative Example 2 | Comparative Example 3 | Comparative Example 4 |
|---|---|---|---|---|---|---|---|
| Component Formulation (parts by | Novolac resin |  |  |  |  |  | 100 |
|  | Resole resin | 100 |  |  |  |  |  |
|  | Hexamethylenetetramine |  |  |  |  |  | 15 |

TABLE 1-continued

Component Formulation, Component-Kneading Means and Molding Method

| weight) | Wood flour | | | Same as in Example 1 | Same as in Example 2 | Same as in Examples 3 and 4 | |
|---|---|---|---|---|---|---|---|
| | Pulp | | | | | | |
| | Pulverized cotton cloth (fiber length = about 1 mm) | | 100 | | | | |
| | Calcium carbonate | | | | | | 50 |
| | Glass fiber (13 $\mu$ × 3 mm) | | 10 | | | | 10 |
| | Others (curing aid, lubricant, etc.) | | 40 | | | | |
| | Methanol | | | | | | |
| Component-kneading means | | Henschel mixer | | Roll | Roll | Henschel mixer | Roll |
| Molding method | Injection molding wherein the movable side die was moved forward after injection of molding material | ○ | ○ | | | | |
| | Ordinary injection molding | | | | ○ | ○ | ○ |
| | Compression molding | | | ○ | | | |
| | Gate sealing | Not conducted | Conducted | | Not conducted | Not conducted | Not conducted |

TABLE 2

Productivity and Properties of Pulley

| | | | Example 1 | Example 2 |
|---|---|---|---|---|
| Productivity | Molding cycle (seconds) | | 70 | 60 |
| Properties | Strength required for pushing out metal insert (kN) | | 12 | 14 |
| | Heat shock (cycles) | | 13 | 20< |
| | Belt abrasion | | Small | Small |
| | Falling ball impact | Dropped from a height of 20 cm | ○ | ○ |
| | | Dropped from a height of 35 cm | Δ | Δ |

| | | | Example 3 | Example 4 | Comparative Example 1 | Comparative Example 2 | Comparative Example 3 | Comparative Example 4 |
|---|---|---|---|---|---|---|---|---|
| Productivity | Molding cycle (seconds) | | 70 | 65 | 300 | 60 | 70 | 60 |
| Properties | Strength required for pushing out metal insert (kN) | | 13 | 13 | 12 | 9 | 10 | 17 |
| | Heat shock (cycles) | | 20< | 20< | 15 | 7 | 12 | 5 |
| | Belt abrasion | | Very small | Very small | Small | Small | Small | Large |
| | Falling ball impact | Dropped from a height of 20 cm | ○ | ○ | ○ | Δ | ○ | Δ |
| | | Dropped from a height of 35 cm | ○ | ○ | Δ | x | Δ | x |

Notes
Test conditions for heat shock:
No load applied on a sample pulley, −40° C. (1 hour) and 130° C. (1 hour)
Test conditions for belt abrasion:
Tension = 1.5 kN, 8,000 rpm, 100 hours

What is claimed is:

1. A process for producing a phenolic resin pulley having a metal insert embedded therein, which process comprises:

setting a metal insert having a form of a cylinder or a circular solid shaft in a cavity of a mold, said mold having a movable side die, a fixed side die and the cavity, closing the mold in a state in which at least a part of the movable side die has been moved backward by a given distance from its predetermined position to be taken when a pulley to be produced has a final shape, injecting a phenolic resin molding material into the cavity to fill the cavity with the molding material, and thereafter moving forward the part of the whole of the movable side die moved backward, to said predetermined position to mold said pulley;

wherein said phenolic resin molding material comprises a phenolic resin and a filler of (a) pulverized cotton cloth in an amount of X parts by weight and (b) a powdery organic fiber selected from a wood flour and a pulp in an amount of Y parts by weight, respectively, per 100 parts by weight of the total filler, provided that X and Y satisfy the following formulas (1) and (2)

$60 \leq X+Y \leq 100$    (1)

$15 \leq X \leq 100$    (2).

2. A process for producing a phenolic resin pulley having a metal insert embedded therein, which process comprises:

setting a metal insert having a form of a cylinder or a circular solid shaft in a cavity of a mold, said mold having a movable side die, a fixed side die and the cavity, closing the mold in a state in which at least a part of the movable side die has been moved backward by a given distance from its predetermined position to be taken when a pulley to be produced has a final shape, injecting a phenolic resin molding material into the cavity to fill the cavity with the molding material, sealing a gate of the mold with a gate-sealing pin, and simultaneously therewith or thereafter moving forward the part of the whole of the movable side die moved backward, to said predetermined position to mold said pulley;

wherein said phenolic resin molding material comprises a phenolic resin and a filler of (a) pulverized cotton cloth in an amount of X parts by weight and (b) a powdery organic fiber selected from a wood flour and a pulp in an amount of Y parts by weight, respectively, per 100 parts by weight of the total filler, provided that X and Y satisfy the following formulas (1) and (2)

$$60 \leq X+Y \leq 100 \qquad (1)$$

$$15 \leq X \leq 100 \qquad (2).$$

3. A process for producing a phenolic resin pulley having a metal insert embedded therein and holes formed in a disc portion thereof, which process comprises:

setting a metal insert having a form of a cylinder or a circular solid shaft in a cavity of a mold, said mold having a movable side die, a fixed side die and the cavity, closing the mold in a state in which pins used for forming said holes have been moved backward from their predetermined positions to be taken later, injecting a phenolic resin molding material into the cavity to fill the cavity with the molding material, and then moving forward the pins to said predetermined positions to mold said pulley;

wherein said phenolic resin molding material comprises a phenolic resin and a filler of (a) pulverized cotton cloth in an amount of X parts by weight and (b) a powdery organic fiber selected from a wood flour and a pulp in an amount of Y parts by weight, respectively, per 100 parts by weight of the total filler, provided that X and Y satisfy the following formulas (1) and (2)

$$60 \leq X+Y \leq 100 \qquad (1)$$

$$15 \leq X \leq 100 \qquad (2).$$

4. A process for producing a phenolic resin pulley having a metal insert embedded therein and holes formed in a disc portion thereof, which process comprises:

setting a metal insert having a form of a cylinder or a circular solid shaft in a cavity of a mold, said mold having a movable side die, a fixed side die and the cavity, closing the mold in a state in which pins used for forming said holes have been moved backward from their predetermined positions to be taken later, injecting a phenolic resin molding material into the cavity to fill the cavity with the molding material, sealing a gate of the mold with a gate-sealing pin, and simultaneously therewith or thereafter moving forward the pins to said predetermined positions to mold said pulley;

wherein said phenolic resin molding material comprises a phenolic resin and a filler of (a) pulverized cotton cloth in an amount of X parts by weight and (b) a powdery organic fiber selected from a wood flour and a pulp in an amount of Y parts by weight, respectively, per 100 parts by weight of the total filler, provided that X and Y satisfy the following formulas (1) and (2)

$$60 \leq X+Y \leq 100 \qquad (1)$$

$$15 \leq X \leq 100 \qquad (2).$$

* * * * *